United States Patent
Tzeng

(10) Patent No.: US 11,152,864 B2
(45) Date of Patent: Oct. 19, 2021

(54) ACTIVE CLAMPING WITH BOOTSTRAP CIRCUIT

(71) Applicant: Silanna Asia Pte Ltd, Singapore (SG)

(72) Inventor: Ren Huei Tzeng, San Diego, CA (US)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/889,194

(22) Filed: Jun. 1, 2020

(65) Prior Publication Data

US 2020/0350825 A1    Nov. 5, 2020

Related U.S. Application Data

(63) Continuation of application No. 16/401,980, filed on May 2, 2019, now Pat. No. 10,673,342.

(51) Int. Cl.
  *H02M 3/335* (2006.01)
  *H02M 1/08* (2006.01)
  *H02M 1/34* (2007.01)
  *H02M 1/00* (2006.01)

(52) U.S. Cl.
  CPC ......... *H02M 3/33569* (2013.01); *H02M 1/08* (2013.01); *H02M 1/0045* (2021.05); *H02M 1/342* (2021.05)

(58) Field of Classification Search
  CPC ......... H02M 1/08–096; H02M 1/0006; H02M 1/0045; H02M 1/34; H02M 1/342; H02M 3/335–33592
  See application file for complete search history.

(56) References Cited

U.S. PATENT DOCUMENTS

| | | | |
|---|---|---|---|
| 5,455,757 A | 10/1995 | Nguyen et al. |
| 6,069,803 A | 5/2000 | Cross |
| 6,452,818 B1 | 9/2002 | Simopoulos |
| RE38,196 E | 7/2003 | Vinciarelli et al. |
| 7,606,051 B1 | 10/2009 | Wittenbreder |

(Continued)

FOREIGN PATENT DOCUMENTS

| | | |
|---|---|---|
| CN | 100525045 C | 8/2009 |
| CN | 102208873 A | 10/2011 |

(Continued)

OTHER PUBLICATIONS

Office Action dated Nov. 4, 2020 for U.S. Appl. No. 16/665,237.

(Continued)

*Primary Examiner* — Fred E Finch, III

(74) *Attorney, Agent, or Firm* — MLO, a professional corp.

(57) ABSTRACT

An active clamp circuit for a power converter having a transformer includes a switch having a drain node, a gate node, and a source node, the drain node configured to be connected to a first terminal of a primary winding of the transformer, a capacitor having a first terminal connected to the source node, and a second terminal to be connected to a second terminal of the primary winding, a gate driver coupled to the gate node to control the switch and having a high-side input node and a low-side input node, the low-side input node being coupled to the first terminal of the capacitor, and a voltage regulator to: i) receive an input voltage from the second terminal of the capacitor, and ii) provide a regulated voltage to the high-side input node using the input voltage and being of a sufficient voltage level to control the switch.

19 Claims, 3 Drawing Sheets

(56) References Cited

U.S. PATENT DOCUMENTS

| | | | |
|---|---|---|---|
| 8,358,518 B2 | 1/2013 | Yang et al. | |
| 9,246,391 B2 | 1/2016 | Berghegger | |
| 10,673,342 B1* | 6/2020 | Tzeng | H02M 1/08 |
| 2003/0179592 A1 | 9/2003 | Nishiyama et al. | |
| 2005/0201128 A1 | 9/2005 | Jin et al. | |
| 2005/0285661 A1 | 12/2005 | Wittenbreder | |
| 2006/0013021 A1 | 1/2006 | Aso | |
| 2006/0062026 A1 | 3/2006 | Wittenbreder | |
| 2007/0263415 A1* | 11/2007 | Jansen | H02M 3/33507 363/21.03 |
| 2008/0315858 A1 | 12/2008 | Hong et al. | |
| 2011/0194313 A1 | 8/2011 | Yoshinaga | |
| 2011/0305048 A1 | 12/2011 | Yang et al. | |
| 2012/0091976 A1 | 4/2012 | Chen et al. | |
| 2014/0185333 A1* | 7/2014 | Yang | H02M 3/33569 363/21.12 |
| 2014/0233275 A1 | 8/2014 | Yang et al. | |
| 2014/0268914 A1 | 9/2014 | Wang et al. | |
| 2015/0003121 A1 | 1/2015 | Yang et al. | |
| 2015/0263639 A1 | 9/2015 | Russell et al. | |
| 2015/0318788 A1 | 11/2015 | Kovacic et al. | |
| 2016/0072399 A1 | 3/2016 | Kikuchi et al. | |
| 2016/0099647 A1 | 4/2016 | Zhang et al. | |
| 2016/0226389 A1 | 8/2016 | Quaglino et al. | |
| 2016/0365801 A1 | 12/2016 | Phadke | |
| 2017/0288528 A1* | 10/2017 | Mccoy | H02M 3/33507 |
| 2018/0115252 A1 | 4/2018 | Chang et al. | |
| 2018/0287481 A1 | 10/2018 | Liu et al. | |
| 2018/0294735 A1 | 10/2018 | Song et al. | |
| 2018/0301999 A1 | 10/2018 | Moon et al. | |
| 2019/0044449 A1 | 2/2019 | Li et al. | |
| 2019/0044450 A1 | 2/2019 | Muto et al. | |
| 2019/0052174 A1 | 2/2019 | Gong | |
| 2019/0131963 A1* | 5/2019 | Gong | H03K 17/0424 |
| 2019/0149052 A1 | 5/2019 | Gong et al. | |
| 2019/0149054 A1 | 5/2019 | Shimura et al. | |
| 2020/0007041 A1 | 1/2020 | Liu et al. | |
| 2020/0112261 A1* | 4/2020 | Strijker | H02M 1/34 |
| 2020/0227995 A1* | 7/2020 | Radic | H02M 3/33592 |
| 2020/0366214 A1* | 11/2020 | Radic | H02M 3/33592 |

FOREIGN PATENT DOCUMENTS

| | | |
|---|---|---|
| CN | 103795260 A | 5/2014 |
| CN | 108683336 A | 10/2018 |
| CN | 108683336 B | 10/2019 |
| JP | 2009290932 A | 12/2009 |
| JP | 2014143209 A | 8/2014 |
| KR | 20160125676 A | 11/2016 |
| KR | 20170108869 A | 9/2017 |
| TW | 201315118 A | 4/2013 |
| WO | 2016171325 A1 | 10/2016 |

OTHER PUBLICATIONS

International Search Report dated Jul. 27, 2020 for PCT Patent Application No. PCT/IB2020/053739.
Official Letter and Search Report dated Aug. 5, 2020 for Taiwan Patent application No. 107145962.
Notice of Allowance dated Apr. 23, 2021 for U.S. Appl. No. 16/913,489.
Notice of Allowance dated Feb. 26, 2021 for U.S. Appl. No. 16/665,237.
Office Action dated Jul. 30, 2020 for U.S. Appl. No. 16/665,237.
Notice of Allowance dated Jan. 5, 2021 for Taiwanese Patent application No. 107145962.
International Search Report dated May 31, 2019 for PCT Patent Application No. PCT/IB2019/050686.
Notice of Allowance dated Feb. 7, 2020 for U.S. Appl. No. 16/401,980.
Notice of Allowance dated Jul. 3, 2019 for U.S. Appl. No. 16/247,227.
Office Action dated Jul. 29, 2019 for U.S. Appl. No. 16/145,819.
Office Action dated May 31, 2019 for U.S. Appl. No. 16/247,227.
Office Action dated Oct. 3, 2019 for U.S. Appl. No. 16/401,980.

* cited by examiner

ACTIVE CLAMPING WITH BOOTSTRAP CIRCUIT

RELATED APPLICATIONS

This application is a continuation of U.S. patent application Ser. No. 16/401,980, filed May 2, 2019, and is related to U.S. patent application Ser. No. 16/145,819, filed on Sep. 28, 2018, and entitled "Integrated Self-Driven Active Clamp", and is additionally related to U.S. Pat. No. 10,461, 626, issued Oct. 29, 2019, and entitled "Active Clamp Circuit", all of which are hereby incorporated by reference for all purposes.

BACKGROUND

Switch-mode power supplies ("power converters") are power management components in modern electronic devices. They provide, among other things, efficient and galvanically isolated power to multiple loads. To achieve high power processing efficiency and/or galvanic isolation, conventionally one or more magnetically coupled elements, semiconductor switches and associated gate driver circuits are required.

The magnetically coupled elements often suffer from non-trivial leakage inductance phenomena, which necessitate the need for affordable voltage snubber circuits to control the semiconductor switch peak drain-to-source voltages. Recycling of energy using an active clamping configuration within the power converter provides an opportunity for power converter form-factor reduction and power efficiency improvement.

Active clamping configurations typically include one or more semiconductor switches and associated gate drivers. When n-channel MOSFET semiconductor devices are used to implement the one or more semiconductor switches, the associated gate drivers may require a voltage that is higher than that of a DC input voltage supplied to the power converter. In such configurations, a "bootstrap" circuit is often used to generate the required higher voltage.

SUMMARY

In some embodiments, an active clamp circuit for a power converter having a transformer includes an active clamp switch having a drain node, a gate node, and a source node, the drain node being configured to be electrically connected to a first terminal of a primary winding of the transformer. The active clamp circuit further includes an active clamp capacitor having a first terminal electrically connected to the source node of the active clamp switch, and a second terminal configured to be electrically connected to a second terminal of the primary winding. The active clamp still further includes a gate driver circuit coupled to the gate node to control the active clamp switch, the gate driver circuit having a high-side input voltage node and a low-side input voltage node, the low-side input voltage node being coupled to the first terminal of the active clamp capacitor. The active clamp circuit still yet further includes a voltage regulator circuit configured to: i) receive an input voltage from the second terminal of the active clamp capacitor, and ii) provide a regulated voltage to the high-side input voltage node of the gate driver circuit using the input voltage, the regulated voltage being of a sufficient voltage level to control the active clamp switch.

In some embodiments, a power converter includes a transformer having a primary winding and a secondary winding, a first terminal of the primary winding being configured to be coupled to a DC voltage input node, the secondary winding being configured to be coupled to a load, a main switch coupled to a second terminal of the primary winding to control a current through the primary winding, and an active clamp circuit. The active clamp circuit includes an active clamp switch having a drain node, a gate node, and a source node, the drain node being configured to be electrically connected to the first terminal of the primary winding of the transformer. The active clamp circuit further includes an active clamp capacitor having a first terminal electrically connected to the source node of the active clamp switch, and a second terminal configured to be electrically connected to the second terminal of the primary winding. The active clamp circuit still further includes a gate driver circuit coupled to the gate node to control the active clamp switch, the gate driver circuit having a high-side input voltage node and a low-side input voltage node, the low-side input voltage node being coupled to the first terminal of the active clamp capacitor. The active clamp circuit still yet further includes a voltage regulator circuit configured to: i) receive an input voltage from the second terminal of the active clamp capacitor, and ii) provide a regulated voltage to the high-side input voltage node of the gate driver circuit using the input voltage, the regulated voltage being of a sufficient voltage level to control the active clamp switch.

DETAILED DESCRIPTION

Some embodiments described herein provide an improved active clamp circuit with an improved bootstrap circuit for use in a power converter that converts an input voltage to an output voltage using a transformer. In some embodiments, the improved bootstrap circuit is advantageously implemented without requiring an additional high-breakdown voltage diode. Additionally, in some embodiments, the improved bootstrap circuit is advantageously implemented without requiring a separate input voltage (i.e., $V_{CC}$), thus simplifying the overall power converter design and/or active clamp integration.

In power converters sensitive to power losses and heat generation, energy dissipation in lossy components in the form of heat is undesirable. Thus, recycling of energy using an active clamping configuration within the power converters provides an opportunity for power converter form-factor reduction and power efficiency improvement. Active clamp circuits, as compared to resistor-capacitor-diode (RCD) snubber circuits, advantageously increase power processing efficiency of the power converter by recycling energy stored in a leakage inductance of the transformer. Additionally, such active clamp circuits clamp a primary side peak voltage of a main switch of the power converter, which enables the power converter to utilize primary side switches having a lower voltage rating, leading to reduced power losses during switch conduction and/or switching.

In some embodiments disclosed herein, an n-channel MOSFET (NMOS) switch is used to implement an active clamp switch of an active clamp circuit of a power converter. NMOS switches advantageously have a lower on-resistance as compared to p-channel MOSFET (PMOS) devices. However, to fully turn an NMOS switch on (i.e., an ON-state whereby a channel region of the NMOS switch is conducting), a sufficient gate-source voltage of the NMOS switch is required.

As disclosed herein, an improved bootstrap circuit is used to generate the gate-source voltage required to control, by a gate driver circuit, the on/off state of an active clamp switch of an active clamp circuit. As disclosed herein, the improved bootstrap circuit does not require a high-breakdown voltage diode which is often required for conventional bootstrap circuit architectures. Additionally, as disclosed herein, the improved bootstrap circuit does not require a second voltage supply (e.g., $V_{CC}$) which is often required by conventional bootstrap circuit architectures.

Figure 1:
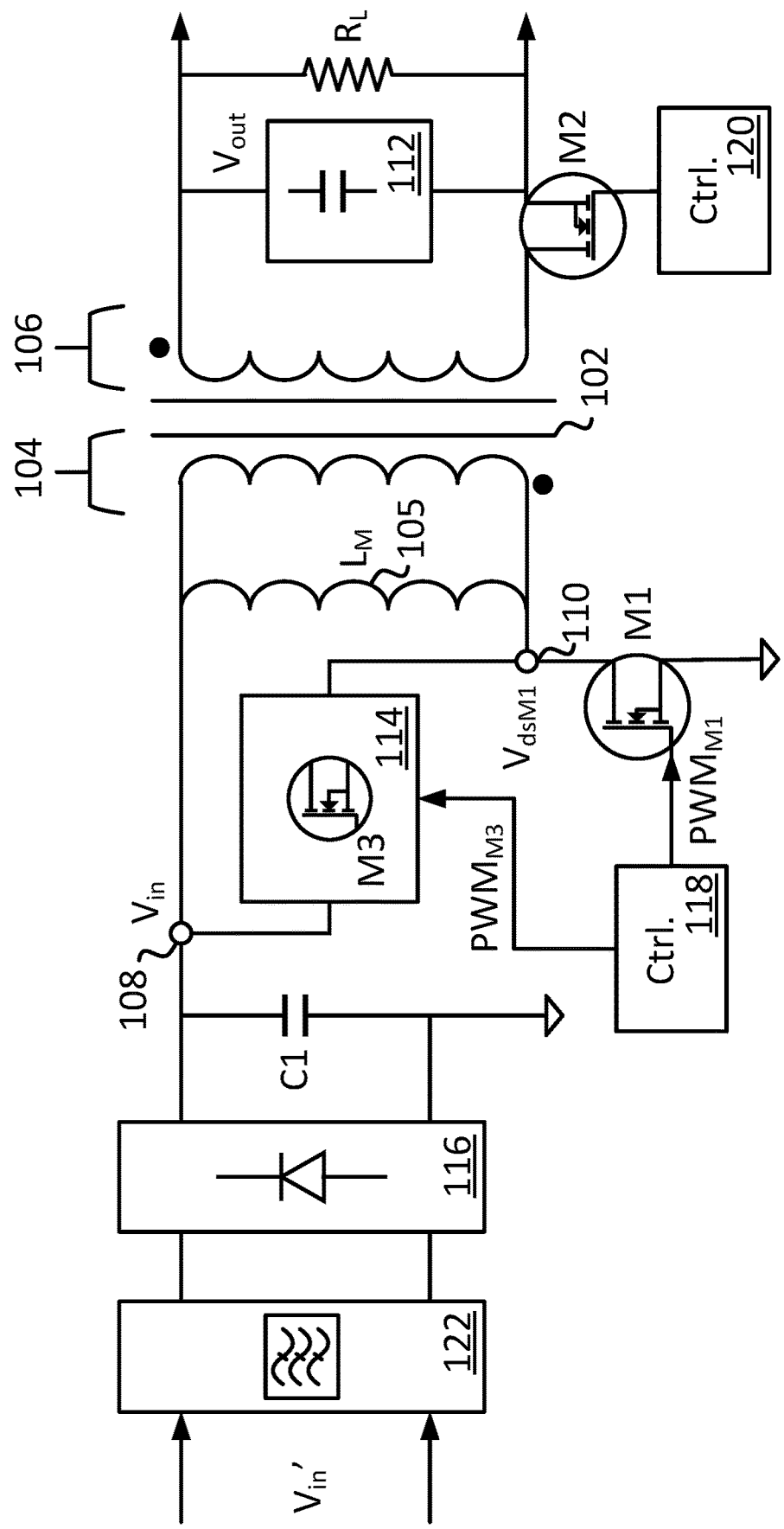
FIG. 1 is a simplified schematic of a power converter having an active clamp circuit, in accordance with some embodiments.

FIG. 1 is a simplified circuit schematic of a power converter 100, in accordance with some embodiments. Some elements of the power converter 100 have been omitted from FIG. 1 to simplify the description of power converter 100 but are understood to be present. A voltage source $V_{in}'$ is received at the power converter 100. $V_{in}'$ can be provided either as an alternating current (AC) or direct current (DC). An input side of the power converter 100 generally includes an input voltage filter block 122, a rectifier block 116 (in the case of AC input), an input voltage buffer capacitor C1, an active clamp circuit 114 (which includes an NMOS active clamp switch M3), a main switch M1 driven by a pulse-width-modulation (PWM) signal $PWM_{M1}$, and a primary side controller circuit 118. The input voltage filter block 122, the rectifier block 116 and the input buffer capacitor C1 provide a filtered, buffered, rectified, or otherwise conditioned input voltage $V_{in}$ (i.e., a DC input voltage at a DC voltage input node) to a transformer 102.

The transformer 102 transfers power from the input side of the power converter 100 to an output side of the power converter 100 and generally includes a primary winding 104 with a first terminal 108 and a second terminal 110. The output side of the power converter 100 generally includes a secondary winding 106 of the transformer 102, an output buffer circuit 112, a synchronous rectifier switch M2, a synchronous rectifier switch controller circuit 120, and is configurable to be connected to a load $R_L$.

The first terminal 108 of the primary winding 104 receives the DC input voltage $V_{in}$. The second terminal 110 of the primary winding 104 is coupled to a drain node of the main switch M1 and to an input of the active clamp circuit 114. The main switch M1 controls a current through the primary winding 104 to charge a magnetizing inductance $L_M$ 105 of the transformer 102 during a first portion of a switching cycle of the power converter 100. The synchronous rectifier switch M2 controls a current flow through the secondary winding 106 to discharge the transformer 102 into the output buffer circuit 112 and the load $R_L$ during a subsequent portion of the switching cycle.

When the main switch M1 is enabled by the primary side controller circuit 118 during the first portion of a switching cycle, current flows through the primary winding 104 to a voltage bias node such as ground, illustrated in FIG. 1 as a triangle coupled to a source node of the main switch M1. The current flow through the primary winding 104 causes energy to be stored in the magnetizing inductance $L_M$ 105 and a leakage inductance $L_L$ (not shown) of the transformer 102. When the main switch M1 is disabled in a subsequent portion of the switching cycle, an output voltage $V_{out}$ is generated at the output buffer circuit 112 and is provided to the load $R_L$. When the main switch M1 is turned off, a reflected voltage ($nV_{out}$) is developed at the primary winding 104. The contribution of the reflected voltage $nV_{out}$ to a drain-source voltage $V_{dsM1}$ of the main switch M1 at the second terminal 110 is expressed as:

$$V_{dsM1} = V_{in} + nV_{out} \quad \text{(Equation 1)}$$

where n is a turns ratio of the transformer 102. Energy stored in the leakage inductance $L_L$ of the transformer 102 also contributes to the voltage $V_{dsM1}$ developed at the second terminal 110. The active clamp circuit 114 prevents the voltage $V_{dsM1}$ from increasing to a level that damages the main switch M1.

Figure 2:
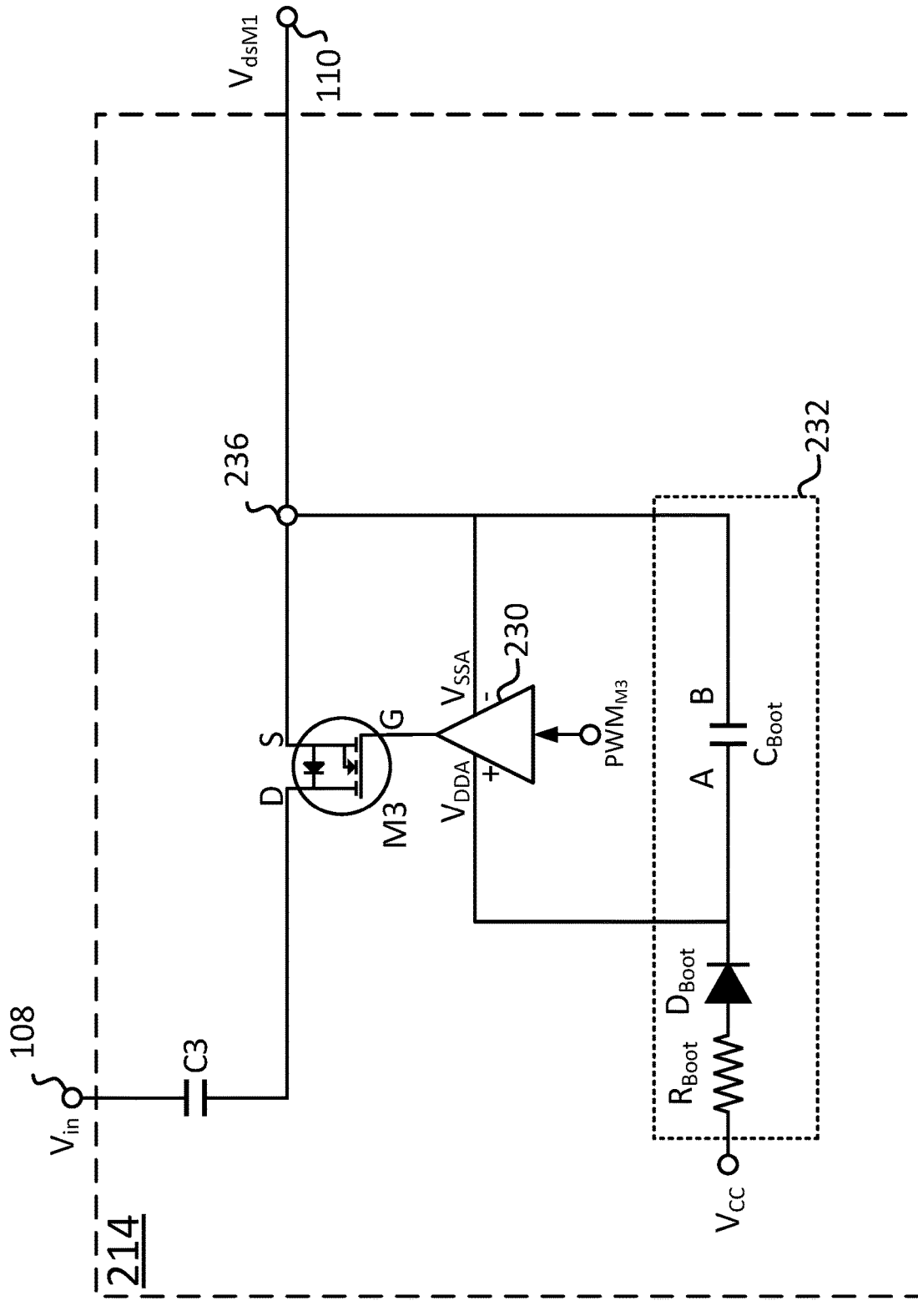
FIG. 2 is a simplified schematic of an example active clamp circuit with a bootstrap circuit that could be used in the power converter shown in FIG. 1.

FIG. 2 is a simplified circuit schematic of an active clamp circuit 214 that could be used to implement the active clamp circuit 114 of FIG. 1, but which has some disadvantages that the present invention mitigates or eliminates. The active clamp circuit 214 generally includes the active clamp switch M3, an active clamp capacitor C3, a gate driver circuit 230 having a high-side input voltage node (+) and a low-side input voltage node (−), and a simplified implementation of a conventional bootstrap circuit 232. The active clamp switch M3 has a gate node (G), a drain node (D) and a source node (S). Some circuit elements have been omitted from the schematic for simplicity.

The conventional bootstrap circuit 232 generally includes a resistor $R_{Boot}$, a high-breakdown voltage diode $D_{Boot}$, and a bootstrap capacitor $C_{Boot}$. Also shown are the terminals 108, 110 of the primary winding 104 of the transformer 102 introduced with reference to FIG. 1, and a node 236.

In order to fully turn the active clamp switch M3 on (i.e., control the active clamp switch M3), the gate driver circuit 230 must drive the gate node G of the active clamp switch M3 with a gate-source voltage that is higher than a turn-on threshold of the active clamp switch M3 (e.g., generally a voltage higher than a voltage at the source node S of the active clamp switch M3). Because the source node S of the active clamp switch M3 is coupled to the second terminal 110 of the primary winding 104, the voltage at the source node S of the active clamp switch M3 will equal to $V_{dsM1}$. Thus, to fully turn on the active clamp switch M3, a voltage higher than $V_{dsM1}$ is required. However, as previously described with reference to equation 1, the voltage $V_{dsM1}$ may be higher than the input voltage $V_{in}$ during portions of the switching cycle.

Thus, the conventional bootstrap circuit 232 is utilized to provide a voltage $V_{DDA}$ to the gate driver circuit 230 to control the active clamp switch M3. The voltage $V_{DDA}$ is as high or higher than the turn-on threshold of the active clamp switch M3 so that the gate driver circuit 230 can fully turn on the active clamp switch M3 in response to an active clamp control signal $PWM_{M3}$ which is provided by a module or circuit (not shown) of the power converter 100 or the active clamp circuit 214. The voltage $V_{DDA}$ is referenced to the terminal 110 (i.e., $V_{DDA}$ has a floating ground). A supply voltage $V_{CC}$ is conventionally generated using another voltage regulator circuit (not shown) of the power converter 100, for example, using a voltage regulator that generates the voltage $V_{CC}$ based on a current received from an auxiliary winding (not shown) of the transformer 102.

The resistor $R_{Boot}$ generally protects the conventional bootstrap circuit 232 and the gate driver circuit 230 from high in-rush currents. In operation, when the main switch M1 of the power converter 100 is on (and the active clamp switch M3 is off), the terminal 110 is pulled to ground (i.e., a bias voltage coupled to the source node of the main switch M1). During this time, the voltage $V_{CC}$ charges the capacitor $C_{Boot}$ through the resistor $R_{Boot}$ and the diode $D_{Boot}$. Thus, node A of the bootstrap capacitor $C_{Boot}$ is charged to approximately $V_{CC}$. At a subsequent time in the switching cycle, when the main switch M1 is turned off, the voltage developed at the bootstrap capacitor $C_{Boot}$ is pulled up by voltage $V_{dsM1}$ developed at the node 236 (as discussed with reference to equation 1). Thus, the voltage at node A, and correspondingly the voltage $V_{DDA}$, reaches a voltage level (approximately $V_{CC}+V_{dsM1}$) which is sufficient to fully turn the active clamp switch M3 on.

Unfortunately, high-breakdown voltage diodes such as the diode $D_{Boot}$ can be both large as well as costly and may preclude integrating the active clamp circuit 214 into a single integrated circuit (IC). Additionally, especially in the systems where the active clamp circuit 114 is implemented as a self-driven clamp module, providing the voltage $V_{CC}$ to the active clamp circuit 214 may introduce design complexity to the power converter 100.

Figure 3:
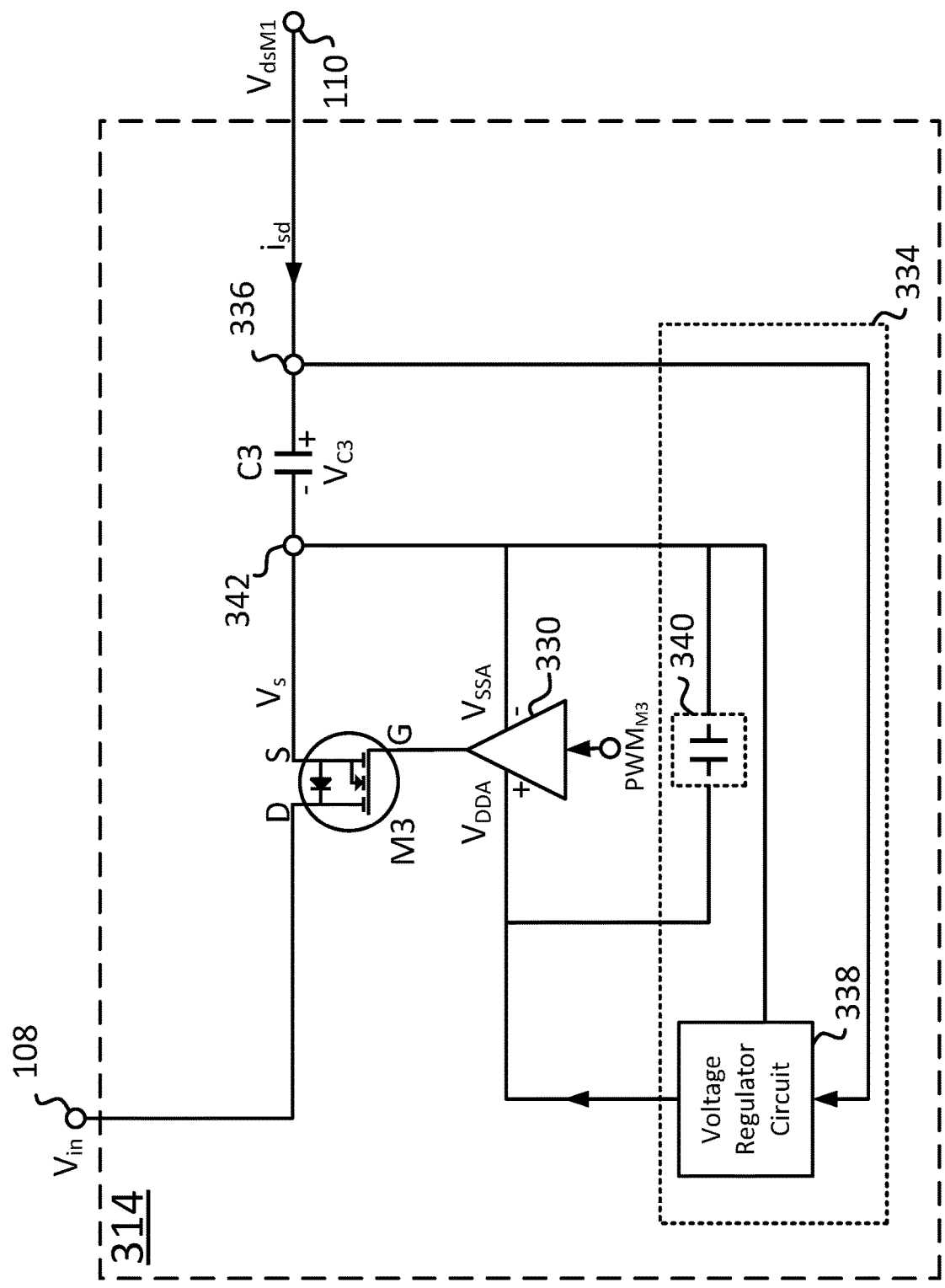
FIG. 3 is a simplified schematic of an example improved active clamp circuit with an improved bootstrap circuit for use in the power converter shown in FIG. 1, in accordance with some embodiments.

FIG. 3 is a simplified circuit schematic of an improved active clamp circuit 314 that implements the active clamp circuit 114 of FIG. 1, in accordance with some embodiments. The improved active clamp circuit 314 generally includes the NMOS active clamp switch M3, the active clamp capacitor C3, a gate driver circuit 330 having a high-side input voltage node (+) and a low-side input voltage node (−), and an improved bootstrap circuit 334. The improved bootstrap circuit 334 generally includes a voltage regulator circuit 338 (e.g., an LDO or other linear power regulator that is configured to lower/reduce and/or limit a received input voltage) and an optional capacitor 340 that is configurable to be coupled across the high-side input voltage node (+) and the low-side input voltage node (−) of the gate driver circuit 330. Also shown are the terminals 108, 110 of the primary winding 104 of the transformer 102 described with reference to FIG. 1, and terminals 336, 342 of the active clamp capacitor C3. Some circuit elements have been omitted from the circuit schematic for simplicity.

The improved bootstrap circuit 334 advantageously does not require an additional power source (i.e., to provide the voltage $V_{CC}$) as compared to the conventional bootstrap circuit 232. Additionally, the improved bootstrap circuit 334 advantageously does not require a high-breakdown voltage diode (i.e., the diode $D_{Boot}$) as compared to the conventional bootstrap circuit 232. Thus, the improved bootstrap circuit 334 can advantageously be integrated into a single IC. In some embodiments, the improved bootstrap circuit 334 is integrated into a single IC along with the remaining circuit components of the active clamp circuit 314 (i.e., the active clamp switch M3, the voltage regulator circuit 338, and the gate driver circuit 330).

As shown, a connection arrangement of the active clamp capacitor C3 disclosed in FIG. 3 differs as compared to a connection arrangement of the active clamp capacitor C3 shown in FIG. 2. As shown in FIG. 3, the active clamp capacitor C3 is connected between the source node S of the active clamp switch M3 and the second terminal 110 of the primary winding 104 of the transformer 102 and is thereby connected to the drain node of the main switch M1. In contrast, the active clamp capacitor C3 shown in FIG. 2 is connected between the drain node D of the active clamp switch M3 and the first terminal 108 of the primary winding 104 of the transformer 102.

The active clamp switch M3 is controlled based on an active clamp control signal $PWM_{M3}$ via the gate driver circuit 330. The active clamp control signal $PWM_{M3}$ is provided by a module or circuit (not shown) of the power converter 100 or of the improved active clamp circuit 314. The active clamp circuit 314 clamps the voltage $V_{dsM1}$ at the drain node of the main switch M1 to a maximum voltage (e.g., within a safe operating range of the main switch M1). In order to fully turn the active clamp switch M3 on in response to the control signal $PWM_{M3}$, the gate driver circuit 330 must drive the gate node G of the active clamp switch M3 with a gate-source voltage that is higher than a turn-on threshold of the active clamp switch M3 (e.g., generally higher than a voltage $V_S$ at the source node S of the active clamp switch M3).

The improved bootstrap circuit 334 advantageously provides a high-side rail voltage $V_{DDA}$ to the high-side input voltage node (+) of the gate driver circuit 330, the voltage $V_{DDA}$ being as high or higher than the turn-on threshold (i.e., higher than a voltage at the source node S) of the active clamp switch M3, such that the gate driver circuit 330 can fully turn the active clamp switch M3 on without requiring a high-breakdown voltage diode and without requiring an external voltage source (e.g., $V_{CC}$). The high-side rail voltage $V_{DDA}$ is referenced to a bias voltage $V_{SSA}$ (i.e., a low-side rail voltage) at the low-side input voltage node (−) of the gate driver circuit 330 which is connected to the terminal 342 of the active clamp capacitor C3. Thus, the voltage $V_{DDA}$ is referenced to a floating ground which is different than a ground of the power converter 100 (e.g., at a source node of the main switch M1). The voltage regulator circuit 338 is configured to lower, buffer, condition, or limit the input voltage received by the voltage regulator circuit 338 such that the voltage $V_{DDA}$ output by the voltage regulator circuit 338 is lowered and/or limited as compared to the voltage received by the voltage regulator circuit 338 from the terminal 336 of the active clamp capacitor C3.

During a portion of a switching cycle of the power converter 100 in which the main switch M1 is in an OFF state (i.e., not conducting), the terminal 110, and thereby the terminal 336, develops a voltage $V_{dsM1}=V_{in}+nV_{out}$ as discussed with reference to equation 1. During this portion of the switching cycle, the active clamp capacitor C3 is charged by a reverse current flow $i_{sd}$ from the terminal 110 to the terminal 108 via a body diode of the active clamp switch M3. As the active clamp capacitor C3 is charged, a voltage $V_{C3}$ develops across the active clamp capacitor C3 (i.e., across the terminals 336, 342), the voltage $V_{C3}$ when measured across the active clamp capacitor C3 being approximately equal to $nV_{out}$.

The voltage regulator circuit 338 receives the voltage difference $V_{C3}$ from across the terminals 336, 342 of the active clamp capacitor C3. The voltage regulator circuit 338 uses the voltage $V_{C3}$ developed across the active clamp capacitor C3 to generate the high-side rail voltage $V_{DDA}$, which is received at the high-side input voltage node (+) of the gate driver circuit 330, by lowering, buffering, limiting, or otherwise conditioning the voltage $V_{C3}$. The bias voltage $V_{SSA}$ is received by the gate driver circuit 330 at the low-side input voltage node (−) from the terminal 342 of the active clamp capacitor C3. The source node S of the active clamp switch M3 and the low-side input voltage node (−) of the gate driver circuit 330 are both coupled to the terminal 342 of the active clamp capacitor C3, and are thus both at a lower voltage relative to $V_{DDA}$ and further are of a different voltage level than a voltage at a ground node of the power converter 100 (e.g., at the source node of the main switch M1). Thus, the gate driver circuit 330 can provide a sufficient gate voltage to the gate node G to fully turn on the active clamp switch M3. The optional capacitor 340 is used in some embodiments to buffer the voltage $V_{DDA}$ received at the gate driver circuit 330.

At a subsequent time in the switching cycle, the active clamp switch M3 is turned off and the main switch M1 is turned on. There is a duration of time before this transition during which both the active clamp switch M3 and the main switch M1 are both turned off. The duration of time during which the active clamp switch M3 and the main switch M1 are both turned off depends on a desired system operation of the power converter 100. At the subsequent time in the switching cycle when the main switch M1 is turned on and the active clamp switch M3 is turned off, the terminal 110, and thereby the terminal 336, is pulled to ground. The switching cycle is repeated when the main switch M1 is turned off again, and the active clamp capacitor M3 is charged once again by the current $i_{sd}$.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An active clamp controller circuit for a power converter having a transformer, comprising:
   an active clamp switch having a drain node, a gate node, and a source node, the drain node being configured to be directly electrically connected to a first terminal of a primary winding of the transformer, the source node being configured to be directly electrically connected to a first terminal of an active clamp capacitor;
   a gate driver circuit coupled to the gate node to control the active clamp switch, the gate driver circuit having a high-side input voltage node and a low-side input voltage node, the low-side input voltage node being configured to be directly electrically connected to the first terminal of the active clamp capacitor; and
   a linear voltage regulator circuit having a voltage input node configured to be directly electrically connected to a second terminal of the active clamp capacitor, a voltage output node directly electrically connected to the high-side input voltage node of the gate driver circuit, and being configured to: i) receive, at the voltage input node, an input voltage from the second terminal of the active clamp capacitor, and ii) provide, from the voltage output node, a linearly regulated voltage to the high-side input voltage node of the gate driver circuit using the input voltage, the linearly regulated voltage being of a sufficient voltage level to control the active clamp switch.

2. The active clamp controller circuit of claim 1, wherein:
   the high-side input voltage node of the gate driver circuit is configured to be directly electrically connected to a first terminal of a second capacitor; and
   the low-side input voltage node of the gate driver circuit is configured to be directly electrically connected to a second terminal of the second capacitor.

3. The active clamp controller circuit of claim 1, wherein:
   the linear voltage regulator circuit is configured to provide the linearly regulated voltage having a lower voltage level than that of the input voltage received by the linear voltage regulator circuit.

4. The active clamp controller circuit of claim 1, wherein:
   the voltage input node of the linear voltage regulator circuit is configured to be directly electrically connected to a drain node of another switch; and
   the active clamp controller circuit is configured to limit a voltage at the drain node of the other switch to a maximum voltage.

5. The active clamp controller circuit of claim 4, wherein:
   the drain node of the other switch is coupled to a second terminal of the primary winding of the transformer;
   the second terminal of the active clamp capacitor is directly electrically connected to the second terminal of the primary winding of the transformer; and
   the other switch controls a current through the primary winding of the transformer.

6. The active clamp controller circuit of claim 1, wherein:
   the drain node of the active clamp switch is configured to be directly electrically connected to a DC voltage input node of the power converter.

7. The active clamp controller circuit of claim 6, wherein:
   the active clamp capacitor is charged by a current originating at the second terminal of the primary winding of the transformer and flowing to the DC voltage input node via the active clamp capacitor and a body-diode of the active clamp switch.

8. The active clamp controller circuit of claim 7, wherein:
   the second terminal of the active clamp capacitor is configured to be directly electrically connected to a drain node of another switch;
   the drain node of the other switch is coupled to the second terminal of the primary winding of the transformer;
   the second terminal of the active clamp capacitor is configured to be directly electrically connected to the second terminal of the primary winding of the transformer;
   the other switch controls a current through the primary winding of the transformer; and
   the active clamp capacitor is charged by a current originating at the second terminal of the primary winding of the transformer when the other switch is turned off.

9. The active clamp controller circuit of claim 1, wherein:
   the drain node of the active clamp switch is configured to be directly electrically connected to a DC voltage input node of the power converter, the DC voltage input node having a DC voltage that is relative to a ground voltage node of the power converter; and
   the low-side input voltage node of the gate driver circuit is offset in voltage relative to a voltage of the ground voltage node.

10. The active clamp controller circuit of claim 9, wherein:
the second terminal of the active clamp capacitor is configured to be directly electrically connected to a drain node of another switch; and
a source node of the other switch is configured to be coupled to the ground voltage node.

11. A power converter comprising:
a transformer having a primary winding and a secondary winding, a first terminal of the primary winding being configured to be coupled to a DC voltage input node, the secondary winding being configured to be coupled to a load;
a main switch coupled to a second terminal of the primary winding to control a current through the primary winding; and
an active clamp circuit comprising:
an active clamp switch having a drain node, a gate node, and a source node, the drain node being directly electrically connected to the first terminal of the primary winding;
an active clamp capacitor having a first terminal directly electrically connected to the source node of the active clamp switch, and a second terminal directly electrically connected to the second terminal of the primary winding of the transformer;
a gate driver circuit coupled to the gate node to control the active clamp switch, the gate driver circuit having a high-side input voltage node and a low-side input voltage node, the low-side input voltage node being directly electrically connected the first terminal of the active clamp capacitor; and
a voltage regulator circuit having a voltage input node directly electrically connected to the second terminal of the active clamp capacitor, a voltage output node directly electrically connected to the high-side input voltage node of the gate driver circuit, and being configured to: i) receive, at the voltage input node, an input voltage from the second terminal of the active clamp capacitor, and ii) provide, from the voltage output node, a regulated voltage to the high-side input voltage node of the gate driver circuit using the input voltage, the regulated voltage being of a sufficient voltage level to control the active clamp switch.

12. The power converter of claim 11, further comprising:
a second capacitor directly electrically connected between the high-side input voltage node and the low-side input voltage node of the gate driver circuit.

13. The power converter of claim 11, wherein:
the regulated voltage provided by the voltage regulator circuit is of a lower voltage level than that of the input voltage received by the voltage regulator circuit.

14. The power converter of claim 11, wherein:
the second terminal of the active clamp capacitor is directly electrically connected to a drain node of the main switch; and
the active clamp circuit is configured to limit a voltage at the drain node of the main switch to a maximum voltage.

15. The power converter of claim 11, wherein:
the drain node of the active clamp switch is configured to be directly electrically connected to the DC voltage input node of the power converter.

16. The power converter of claim 15, wherein:
the active clamp capacitor is configured to be charged by a current originating at the second terminal of the primary winding of the transformer and flowing to the DC voltage input node via the active clamp capacitor and a body-diode of the active clamp switch.

17. The power converter of claim 16, wherein:
the second terminal of the active clamp capacitor is configured to be directly electrically connected to a drain node of the main switch; and
the active clamp capacitor is configured to be charged by the current originating at the second terminal of the primary winding of the transformer when the main switch is turned off.

18. The power converter of claim 11, wherein:
the drain node of the active clamp switch is configured to be directly electrically connected to the DC voltage input node of the power converter, the DC voltage input node having a DC voltage that is relative to a ground voltage node of the power converter; and
the low-side input voltage node of the gate driver circuit is offset in voltage relative to a voltage of the ground voltage node.

19. The power converter of claim 18, wherein:
a source node of the main switch is configured to be coupled to the ground voltage node.

* * * * *